US 6,774,805 B1

(12) United States Patent
Viesselmann et al.

(10) Patent No.: US 6,774,805 B1
(45) Date of Patent: Aug. 10, 2004

(54) WRAP MATERIAL OPERATION SENSOR FOR A ROUND BALER

(75) Inventors: Kim P. Viesselmann, Grafton, WI (US); Scott V. Grahl, St. Cloud, WI (US); Carl S. Silbernagel, Rhinelander, WI (US)

(73) Assignee: Gehl Company, West Bend, WI (US)

( * ) Notice: Subject to any disclaimer, the term of this patent is extended or adjusted under 35 U.S.C. 154(b) by 0 days.

(21) Appl. No.: 10/325,022

(22) Filed: Dec. 20, 2002

(51) Int. Cl.[7] .............................................. G08B 21/00
(52) U.S. Cl. ...................... 340/675; 340/684; 53/504; 56/131; 56/432
(58) Field of Search ................................ 340/673, 675, 340/676; 53/493, 504, 116, 118, 389.2–389.5, 587; 111/200, 915

(56) References Cited

U.S. PATENT DOCUMENTS

5,551,218 A  9/1996 Henderson et al. ........... 53/504

Primary Examiner—Jeffery Hofsass
Assistant Examiner—Jennifer Stone
(74) Attorney, Agent, or Firm—Boyle Fredrickson Newholm Stein & Gratz S.C.

(57) ABSTRACT

An operation sensor for a wrap material dispensing system of a round baler. The operation sensor includes a rotatable member with which the wrap material is engaged, and which rotates along with the wrap material as the wrap material is fed to a wrap material feeding arrangement for introduction into the round baler. Rotation of the rotatable member is detected by a sensing arrangement, which is interconnected with a visual display for providing a user with a visual indication as to the rate of advancement of the wrap material.

19 Claims, 6 Drawing Sheets

WRAP MATERIAL OPERATION SENSOR FOR A ROUND BALER

BACKGROUND AND SUMMARY OF THE INVENTION

This invention relates to a baler for forming round bales of agricultural crop material, and more particularly to a wrap material dispensing system for an agricultural round baler.

A round baler is typically provided with either a twine wrap system or a mesh or net wrap system, in which a mesh or net wrap material is applied to the outer surface of the bale. A twine wrap system is typically located in the front of the baler, which provides the user with visual access during the wrapping operation to ensure that twine is properly being dispensed from the twine system and applied to the bale.

Net or mesh wrap systems typically are mounted to the rear of the baler, such that the components of the system are not visible to the user, who is typically seated on the seat of a tow vehicle such as a tractor. Further, wrap material dispensing systems typically are contained within a housing to enclose the moving parts of the system, which also hinders visual access. While wrap material systems typically incorporate sensors for controlling operation of the system according to certain wrapping parameters, it is often the case that a malfunction in the system is not detected until a significant amount of wrap material has been dispensed, and either improperly applied to the bale or caught elsewhere in the components of the baler. The user must then stop operation of the baler and remove the improperly dispensed material, and then initiate a subsequent wrapping operation to wrap the bale. This entails a significant loss of time as well as a waste of wrap material. Alternatively, if the wrap material is not properly engaged with the advancement mechanism, the wrap material may not be dispensed onto the bale at all and the user may not be made aware of this condition until a significant amount of time has passed.

It is an object of the present invention to provide an operation sensor for a wrap material dispensing system in a round baler, which is operable to detect advancement of the wrap material and to provide a visual indication of wrap material advancement to the user. It is a further object of the invention to provide such a system which can easily be incorporated into the components of the round baler. It is a further object of the invention to provide such a system in which the visual indication of wrap material dispensing is incorporated into an existing visual display. A still further object of the invention is to provide such a system which provides a user with a visual indication of different speeds of advancement of the wrap material, to enable the user to know when the wrap material is engaged with the belts of the baler.

In accordance with the present invention, an operation sensor for a wrap material dispensing system of a round baler includes a wrap material advancing arrangement which is operable to advance wrap material from a wrap material supply arrangement toward a wrap material feeding arrangement associated with the baler. The wrap material feeding arrangement is operable to supply the wrap material to a wrap material inlet of the baler for application to the bale. The wrap material advancing arrangement includes at least one roller located upstream of the wrap material feeding arrangement and with which the wrap material is engaged. The wrap material advancing roller is operable upon rotation to advance the wrap material toward the wrap material feeding arrangement, and the roller is stationary when the wrap material is not being advanced.

The operation sensor of the present invention functions to detect rotation of the wrap material advancing roller, which corresponds directly to advancement of the wrap material. In one form, rotation of the wrap material advancing roller is sensed by means of a magnet which is rotatable along with the wrap material advancing roller. The magnet is carried by a disc member interconnected with a shaft to which the wrap material advancing roller is mounted, such that rotation of the wrap material advancing roller causes rotation of the disc member through the shaft. A sensor is mounted in the vicinity of the disc member, and passage of the magnet past the sensor actuates the sensor to provide an input for each revolution of the wrap material advancing roller. The sensor is interconnected with a processor associated with the baler, which in turn is interconnected with a visual display located in the vicinity of the user, e.g. in the cab of the tow vehicle. As the wrap material is advanced, the sensor inputs are converted by the processor to a count of the number of revolutions of the wrap material advancing roller, which is displayed on the visual display to provide a visual indication to the user of an ascending count of roller revolutions as the wrap material is advanced by the roller.

The wrap material advancing arrangement is operable to engage the leading end of the wrap material with the wrap material feeding arrangement, which utilizes the wrap belts of the baler to advance the wrap material toward the wrap material inlet of the baler. The wrap material is advanced at a first rate of speed by the wrap material advancing arrangement, and subsequently is advanced at a second rate of speed greater than the first rate of speed when the wrap material is engaged with the wrap material feeding arrangement. The wrap material remains in engagement with the wrap material advancing roller when the wrap material is moved toward the wrap material inlet by the wrap material feeding arrangement. The wrap material advancing roller includes a mechanism, such as an overrunning clutch, to enable it to rotate at a rapid speed of rotation in response to advancement of the wrap material by the wrap material feeding arrangement. The speed of rotation of the wrap material advancing roller corresponds directly to the rate of advancement of the wrap material, such that the frequency of the ascending count on the visual display increases when the wrap material is advanced by the wrap material feeding arrangement. In this manner, the ascending count on the visual display enables a user to first ascertain that the wrap material is being advanced by the wrap material advancing arrangement, and to subsequently ascertain that the wrap material has been engaged by the wrap material feeding arrangement for supply to the wrap material inlet and application to the bale. After the wrap material has been applied and cut, the wrap material is no longer advanced and rotation of the wrap material advancing roller stops, so that the count number on the visual display is stopped and the user is provided with a visual indication that wrap material is no longer being dispensed.

The invention contemplates an operation sensor for a wrap material dispensing system as set forth in the foregoing summary, as well as an improvement in a wrap material dispensing system and a method of monitoring operation of a wrap material dispensing system, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
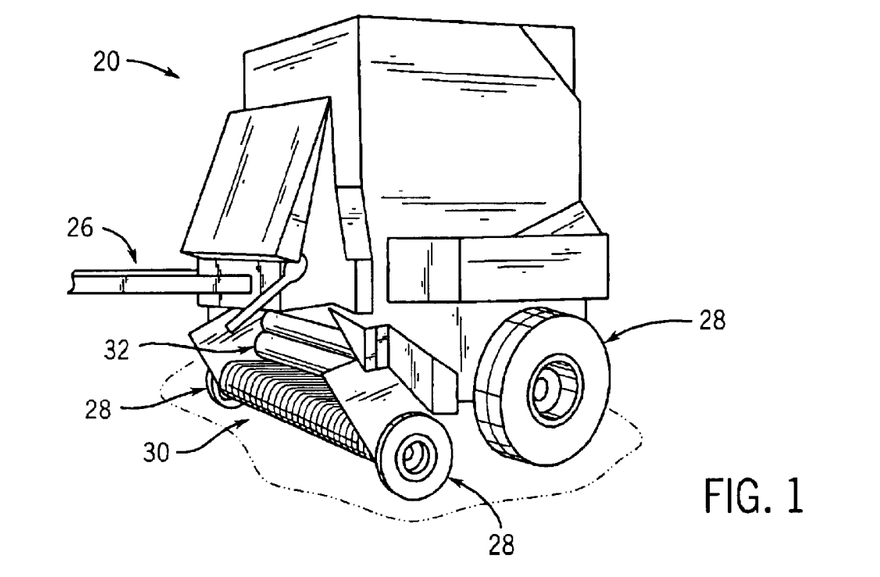
FIG. 1 is an isometric view of a round baler incorporating a wrap material dispensing system having an operation sensor in accordance with the present invention.
Figure 2:
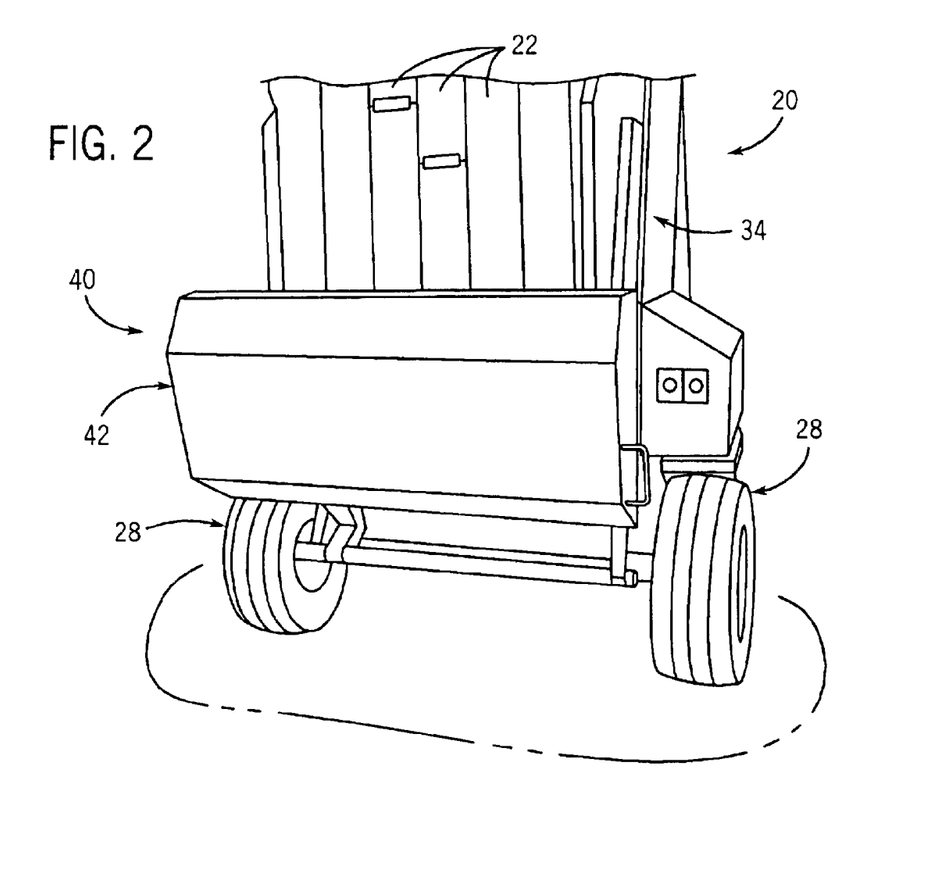
FIG. 2 is a partial rear isometric view showing a portion of the round baler of FIG. 1 and a housing within which the wrap material dispensing system is contained.
Figure 3:
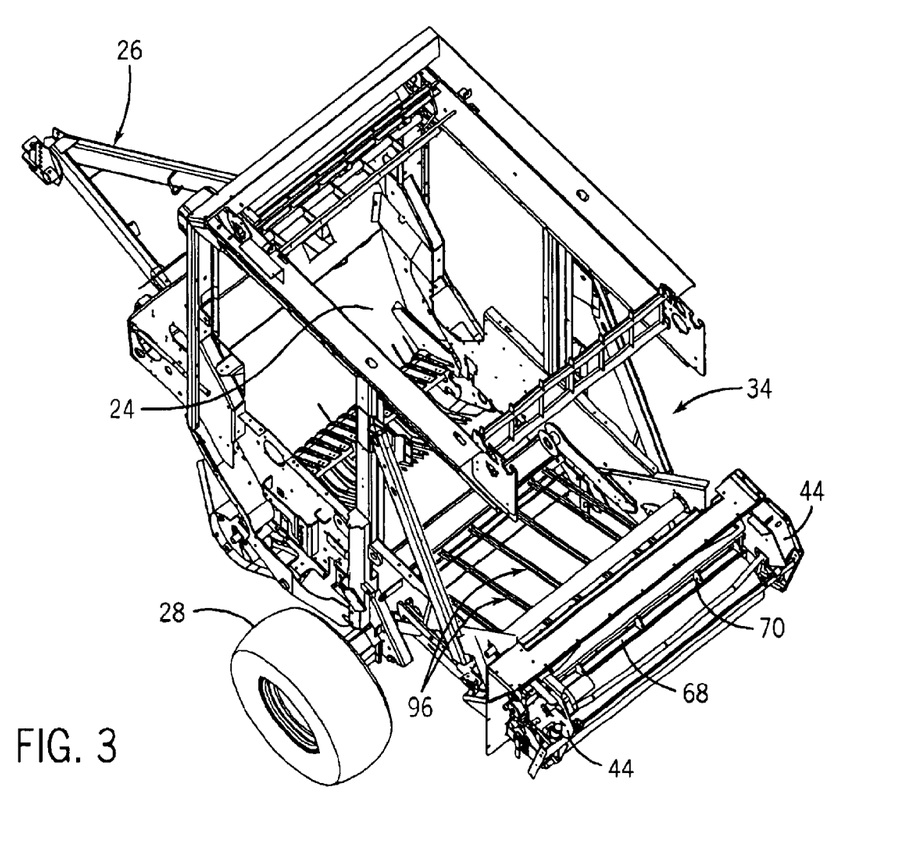
FIG. 3 is an isometric view illustrating a frame incorporated in the round baler of FIGS. 1 and 2 and the components of the wrap material dispensing system incorporating the operation sensor of the present invention.

With reference to FIGS. 1–3, a round baler 20 including a wrap material dispensing system having an operation sensor in accordance with the present invention, includes a series of side-by-side belts 22 that cooperate to define an internal bale-forming chamber 24 within which a round bale of agricultural crop material is adapted to be formed. Baler 20 includes a tongue 26 adapted to be engaged with a tow vehicle such as a tractor, and a pair of wheels 28 which allow baler 20 to move along the ground behind the tow vehicle. A pickup mechanism 30 is adapted to lift crop material off the ground and to supply the crop material rearwardly to a crop inlet 32, which enables the crop material to pass into bale-forming chamber 24. In a known manner, operation of belts 22 functions to form the crop material a round bale within bale-forming chamber 24 upon operation of baler 20.

Baler 20 includes a tailgate 34 with which baler belts 22 are engaged. Tailgate 34 is movable between a closed position as shown in the drawing figures, and an open position to enable a formed bale to be discharged from baler 20, again in a known manner. Tailgate 34 is maintained in its closed position during bale formation, and is moved to its open position so as to allow the formed bale to be discharged from bale-forming chamber 24.

A wrap material dispensing system, shown at 40, is mounted to tailgate 34 for supplying mesh or net-type wrap material to a bale after the bale has been fully formed in bale-forming chamber 24. As shown in FIG. 2, wrap material dispensing system 40 is enclosed within a housing 42 which is mounted to tailgate 34. Wrap material dispensing system 40 is shown and described in copending application Ser. No. 10/326,520 filed Dec. 20, 2002, the disclosure of which is hereby incorporated by reference.

Wrap material dispensing system 40 is adapted to supply a web of wrap material, shown at W, from a roll of wrap material, shown at R. Roll R of wrap material is rotatably supported between a pair of end panels 44, which provide support for roll R as well as the components incorporated in wrap material dispensing system 40.

Wrap material dispensing system 40 includes a wrap material advancing arrangement in the form of a pair of nip rolls 46, 48 rotatably supported between end panels 44, as well as a drive motor 50 mounted to one of end panels 44 and a knife assembly 52 pivotably supported between end panels 44.

Figure 4:
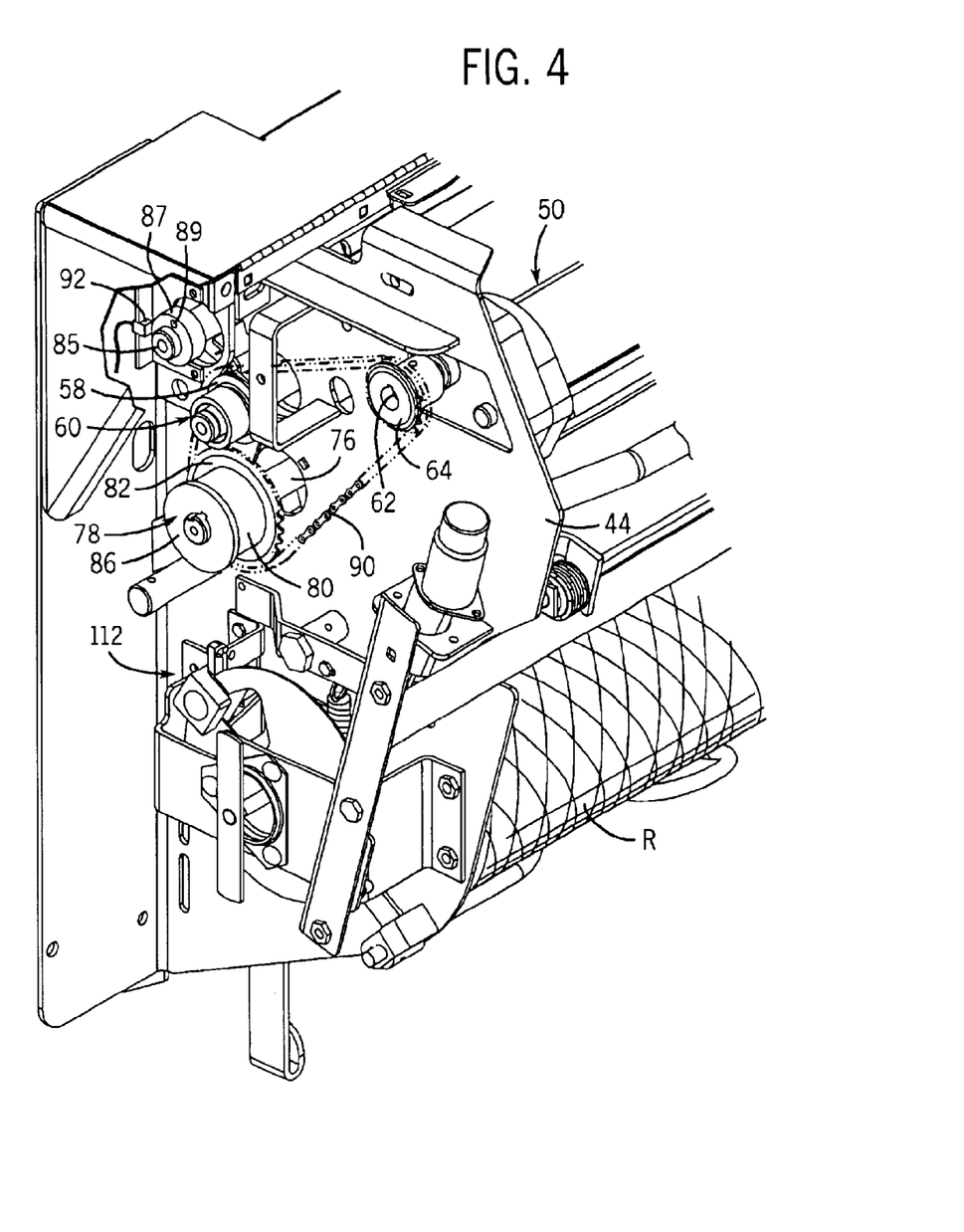
FIG. 4 is a partial isometric view illustrating the components of a wrap material advancing arrangement incorporated into the wrap material dispensing system in the baler of FIGS. 1–3, which includes the operation sensor of the present invention.
Figure 6:
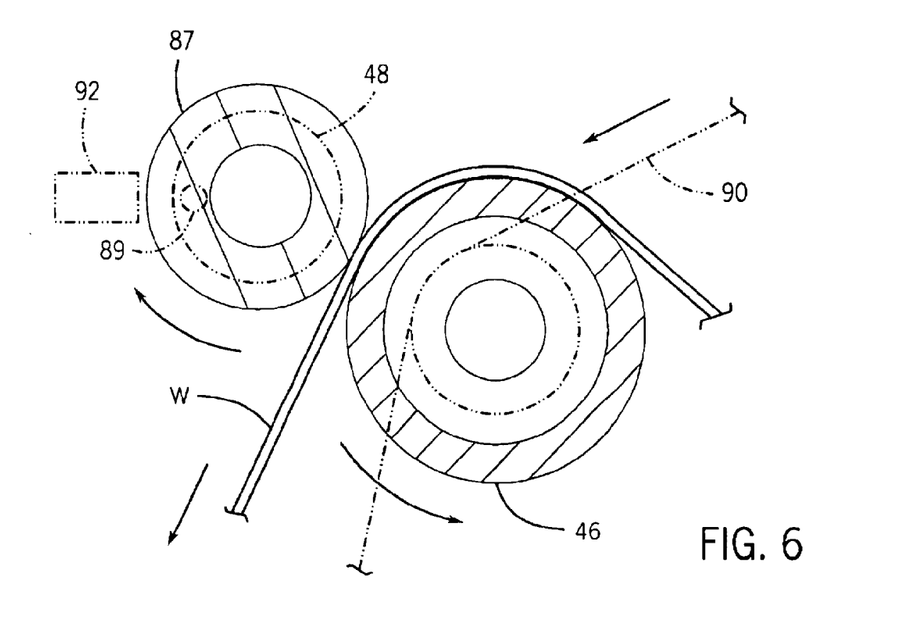
FIG. 6 is a partial section view illustrating a pair of wrap material advancing nip rollers incorporated into the wrap material advancing arrangement of FIGS. 4 and 5, for advancing the wrap material.

As shown in FIGS. 4 and 6, nip roll 46 is a driven roll, and is carried by a nip roll shaft 54 supported by a pair of suitable bearing assemblies mounted to end panels 44. One end of nip roll shaft 54 extends outwardly beyond its associated end panel 44, and a sprocket 58 is engaged with the extension of nip roll shaft 54 via an overrunning clutch mechanism shown generally at 60.

Nip roll 48 is an idler roll which is engaged with driven nip roll 46 so as to be rotatable in response to rotation of driven nip roll 46, in a manner as is known. Idler nip roll 48 is mounted to and between end panels 44 via suitable bearing assemblies in a known manner. Web W of wrap material is engaged with and between nip rolls 46, 48. In this manner, rotation of nip rolls 46, 48 causes advancement of wrap material web W. Conversely, such engagement of web W with nip rolls 46, 48 causes nip rolls 46, 48 to rotate in response to advancement of web W, in a manner to be explained.

Motor 50 includes a rotatable output shaft 62 that extends outwardly from end panel 44. A drive sprocket 64 is secured to and rotatable with motor output shaft 62, in a known manner. Motor 50 may representatively be a reversible CD-type motor such as is available from the Fasco Division of Invensys Corporation of Springfield, Mo. under its designation VW84, although it is understood that any other satisfactory type of reversible drive motor may be employed.

Knife assembly 52 includes a knife member 68 carried by a series of knife support arms 70, each of which is mounted at an inner end to a pivotable knife actuator shaft 72. Knife actuator shaft 72 is pivotally or rotatably supported at its ends by suitable bearings mounted to end panels 44. Knife actuator shaft 72 includes an extension 76, and a one-way knife actuating clutch assembly 78 is mounted to shaft extension 76. Knife actuating clutch assembly 78 is in the form of an axial pin clutch, which is shown and described in the copending '520 application. Knife actuating clutch assembly 78 includes a generally cylindrical clutch body 80 to which a sprocket 82 is secured. A bushing is located between shaft extension 76 and clutch body 80, such that clutch body 80 is freely rotatable relative to shaft extension 76. Knife actuating clutch assembly 78 further includes a cap member 86 having a collar that defines a passage within which the end portion of shaft extension 76 is received. Cap 86 is non-rotatably mounted to shaft extension 76, such as by means of a key-type connection between cap 86 and shaft extension 76.

A chain 90 is engaged with motor drive sprocket 64, and with driven nip roll sprocket 58 and knife actuating clutch sprocket 82. In this manner, operation of motor 50 imparts rotation to motor output shaft 62, which is transferred through motor drive sprocket 64 and chain 90 to rotate driven nip roll 46.

Web W of wrap material is located between driven nip roll 46 and idler nip roll 48, as shown in FIG. 6. With this arrangement, rotation of driven nip roll 46 in response to operation of motor 50 causes idler nip roll 48 to rotate in an opposite direction, to advance wrap material web W.

Figure 5:
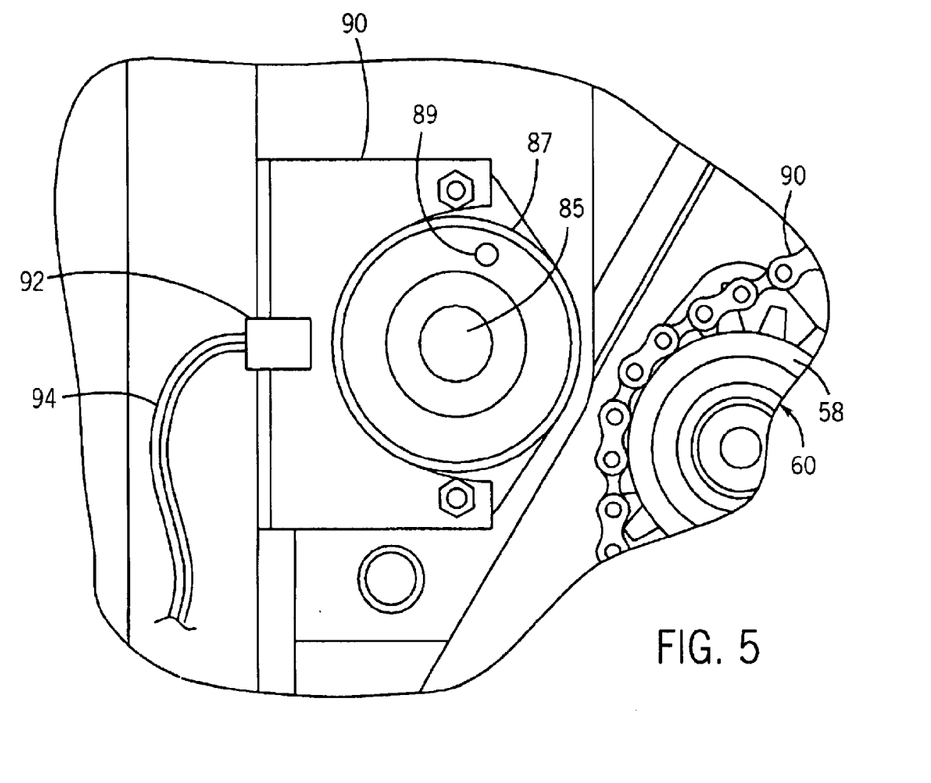
FIG. 5 is an end elevation view of a sensor incorporated in the wrap material advancing arrangement shown in FIG. 4 for detecting rotation of a wrap material advancing roller incorporated in the wrap material advancing arrangement.
Figure 10:
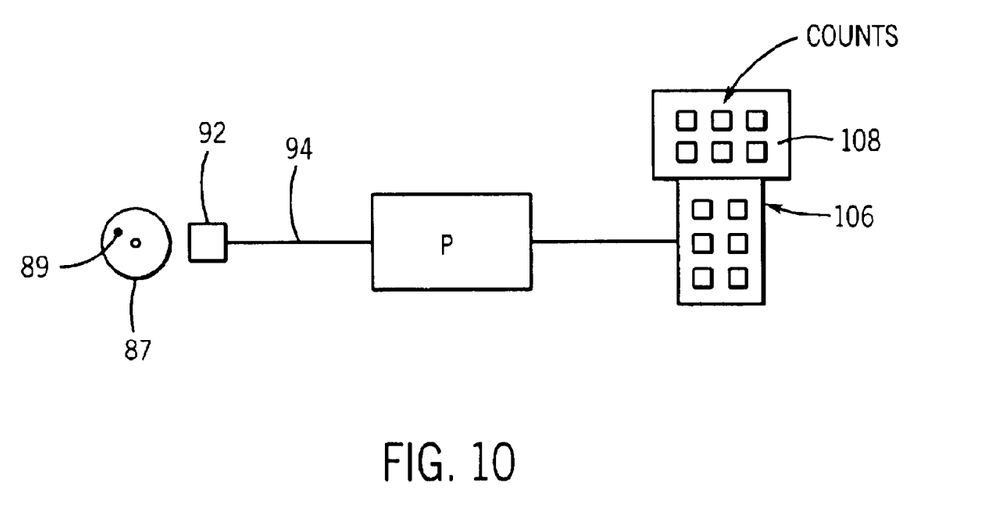
FIG. 10 is a block diagram illustrating connection of the operation sensor of FIGS. 7 and 8 with the module of FIG. 9.

As shown in FIGS. 4 and 5, idler nip roll 48 includes a shaft extension 85 located outwardly of end panel 44. A disc member 87 is engaged with shaft extension 85 so as to be rotatable with shaft extension 85, and a magnet 89 is engaged with disc member 87. A mounting bracket 90 is mounted to end panel 44 adjacent disc member 87, and a sensor 92 is secured to mounting bracket 90. Leads 94 extend from sensor 92, and are interconnected with a processor P (FIG. 10). Sensor 92 is a magnetic sensor, which senses the presence of magnet 89 when magnet 89 is moved into the vicinity of sensor 92 during rotation of disc member 86. Sensor 92 thus provides inputs through leads 94 to baler processor P, each of which indicates a revolution of disc member 87 and thereby a revolution of idler nip roll 48.

Figure 7:
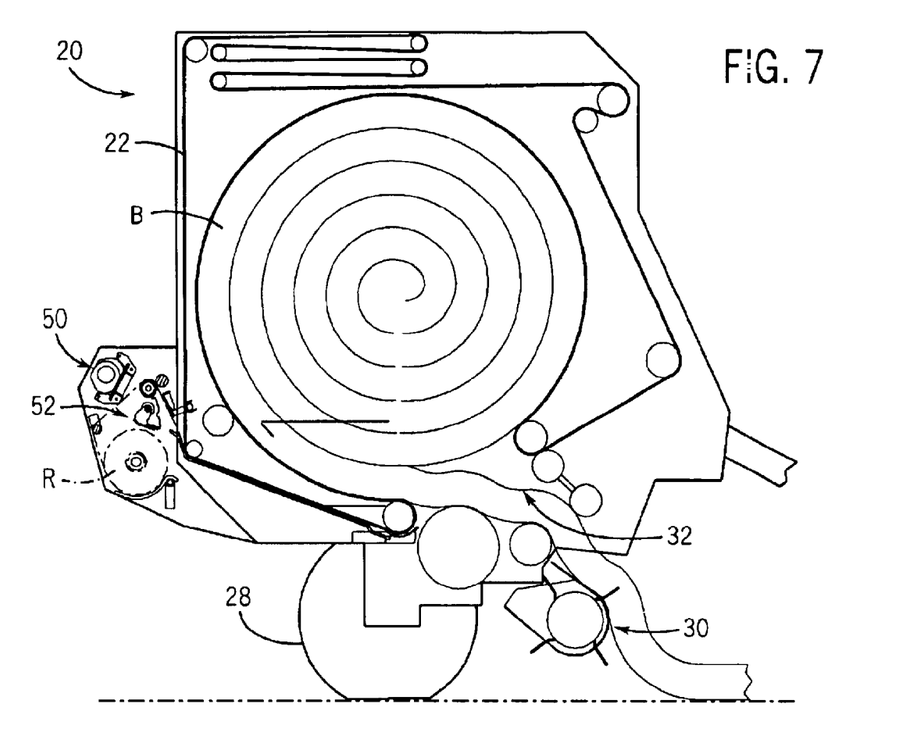
FIG. 7 is a cross-sectional view of the baler of FIGS. 1–3, showing the wrap material advancing arrangement and a wrap material feeding arrangement for supplying wrap material to a wrap material inlet of the baler.
Figure 8:
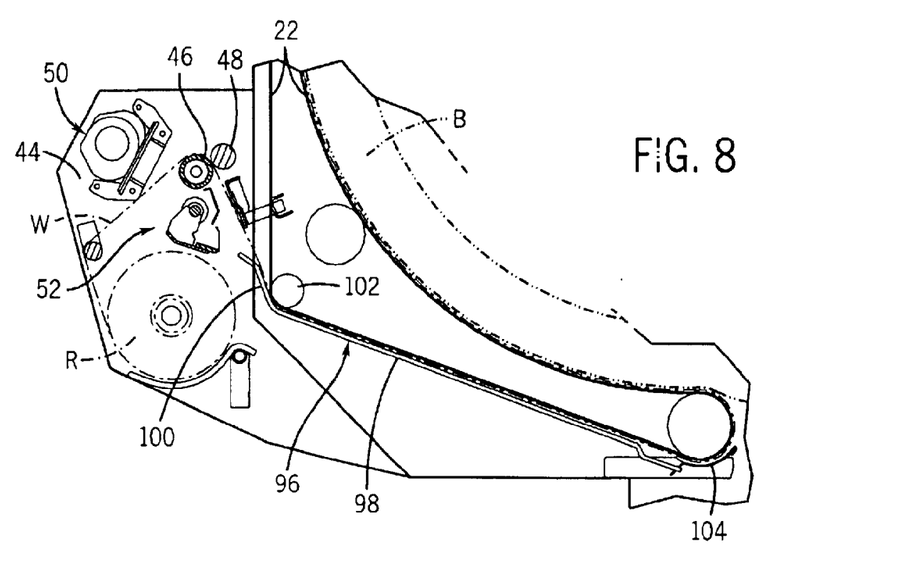
FIG. 8 is an enlarged partial section view showing the wrap material advancing arrangement and the wrap material feeding arrangement of FIG. 7 in greater detail.

As shown in FIGS. 7 and 8, a wrap material feeding arrangement is located below wrap material dispensing system 40, for advancing wrap material W into bale-forming chamber 24. The wrap material feeding arrangement includes a series of wrap material guide bars 96, each of which defines an inner section 98 and an outer section 100. Each inner section 98 is located in a space defined between an adjacent pair of baler belts 22. Guide bar inner sections 98 are located even with or slightly inwardly of the outwardly facing surfaces of the adjacent baler belts 22, to provide positive engagement of wrap material web W with baler belts 22. Guide bar outer sections 100 diverge outwardly from baler belts 22 in the vicinity of a lower roller 102 of baler 20, to define a convergent area or pinch point toward which the end of wrap material web W is advanced by operation of nip rollers 46, 48. Arcuate fingers 104 extend from the inner ends of guide bar inner sections 120, and have a contour that matches that of baler belts 22 adjacent crop inlet 32.

Figure 9:
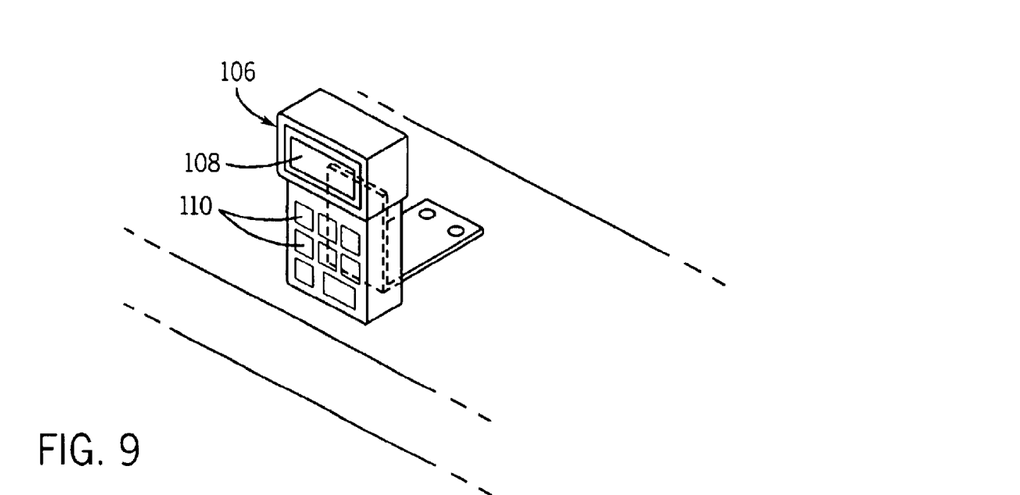
FIG. 9 is a partial isometric view illustrating a module interconnected with the operation sensor of FIGS. 7 and 8, which includes a visual display to indicate the rate of advancement of the wrap material to a user.

Referring to FIGS. 9 and 10, sensor leads 94 are connected to baler processor P, such that processor P receives the inputs from sensor 92 in response to movement of magnet 89 past sensor 92 upon rotation of idler nip roll 48. In a known manner, an operator interface module 106 is interconnected with processor P of baler 20, and includes a visual screen or display 108 and manually actuable buttons 110 for setting and controlling the parameters of operation of baler 20.

In operation, wrap material dispensing system 40 of the present invention functions as follows to apply wrap material to a formed bale, such as bale B (FIG. 7) to apply wrap material W to the outer periphery of bale B.

During normal operation, rotation of wrap material roll R is prevented by engagement of a brake assembly 112 (FIG. 4) with a disc member 114 that is engaged with wrap material roll R for rotation along with wrap material roll R. When bale B has been formed to its desired size, advancement of baler 20 is stopped so that no additional crop material is supplied to bale-forming chamber 24 by pickup mechanism 30. Bale B continues to rotate within bale-forming chamber 24 by virtue of continued movement of baler belts 22. Brake assembly 112 is released, and motor 50 is operated so as to rotate motor output shaft 62 in a first direction such that drive chain 90 imparts rotation to driven nip roll 46 in a clockwise direction with reference to FIG. 6. Such rotation of driven nip roll 46 causes advancement of wrap material W, which is located between and engaged with nip rollers 46 and 48. Knife actuating clutch assembly 78 does not engage when clutch body 80 is rotated by drive chain 90 during such advancement of wrap material W. Rather, clutch body 80 spins freely relative to knife actuator shaft 72, and knife assembly 52 remains in its inoperative or rest position during advancement of wrap material W by operation of drive motor 50.

During advancement of wrap material web W in this manner, rotation of idler nip roll 48 causes magnet 89 to pass sensor 92, and each passage of magnet 89 past sensor 92 provides an input to processor P that indicates a revolution of idler roll 48. The inputs to processor P from sensor 92 are converted by processor P to provide an ascending pinch roll count to module 106, which is displayed to the operator via visual display 108 of module 106. The frequency of the ascending count on visual display 108 corresponds directly to the rate of advancement of wrap material web W. Nip rolls 46 and 48 drive web W toward the wrap material feeding arrangement at a first rate or speed of advancement, which corresponds to a first relatively low frequency of inputs to baler processor P through sensor 92 and leads 94. Using visual display 108, the operator observes the frequency of the ascending pinch roll count, to ascertain the speed of advancement of wrap material W.

Advancement of wrap material W by nip rolls 46, 48 causes the end of wrap material web W to be advanced toward the pinch point between baler belts 22 and outer sections 100 of guide bars 96. When the end of wrap material web W reaches the point of convergence between guide bars 96 and baler belts 22, the frictional engagement of wrap material web W with baler belts 22 functions to draw wrap material web W along with baler belts 22 toward crop inlet 32, where the end of wrap material W is moved into crop inlet 32 by arcuate fingers 104.

Baler belts 22 move wrap material web W at a greater speed of advancement than that which is provided by operation of drive motor 50. When wrap material web W is advanced by engagement with baler belts 22, overrunning clutch 60 allows driven nip roll 46 to freewheel, such that advancement of wrap material web W functions to impart rotation to nip rolls 46, 48 at a greater speed of rotation than is provided by operation of motor 50. Wrap material web W is thus unwound from roll R and advanced at a relatively rapid rate of advancement by baler belts 22. When this occurs, operation of drive motor 50 is discontinued, and wrap material web W is applied to the exterior of bale B during rotation of bale B within bale-forming chamber 24.

During such rapid advancement of wrap material W by engagement with baler belts 22, magnet 89 passes sensor 92 at an increased frequency, to provide inputs to the baler processor P through leads 94 which continue to be displayed as ascending pinch roll counts on user interface screen 98. Such an increase in the speed of advancement of wrap material W provides an increasing frequency of the ascending pinch roll counts which is visible to the user via visual display 98 of module 106.

During initial advancement of wrap material W by operation of motor 50, the advancement of wrap material W is detected by the user by visually observing the ascending numerical pinch roll counts on visual display 98, and the same holds true during advancement of wrap material W by engagement with baler belts 22. In the event the pinch counts stop at any time during operation of wrap material dispensing system 40, this provides the user with a visual indication of a malfunction, e.g. breakage of wrap material W, or a lack of operation of wrap material dispensing system 40 for any other reason. The user is thus able to immediately be informed of the malfunction, and to stop operation for troubleshooting, inspection and repair.

When a desired amount of wrap material web W has been applied to bale B, motor 50 is operated in a reverse direction. Overrunning clutch 60 allows such reverse movement of sprocket 58 relative to driven nip roller 46, since wrap material web W continues to be dispensed during such reverse operation of motor 50. Brake 112 is applied to clamp disc member 114, and to prevent further rotation of roll R. This functions to provide tension in wrap material web W.

When motor 50 is operated in the reverse direction in this manner, knife actuating clutch assembly 78 is engaged to impart rotation to cap 86 of knife actuating clutch assembly 78 along with clutch body 80, in response to such reverse movement of drive chain 110. Rotation of cap 86 in this manner causes knife actuator shaft 72 to rotate, so as to move knife member 68 from its rest position to its cutting position, in which the sharpened edge of knife 86 is moved into contact with wrap material web W. In this manner, wrap material web W is severed, and the trailing end of wrap material web W is advanced by baler belts 22 to be wrapped onto bale B. Subsequent to severing of wrap material web W, motor 50 is operated to impart a small amount of rotation to output shaft 62 in the first direction of rotation, which allows knife assembly 52 to return by gravity to the rest position in preparation for a subsequent wrapping operation.

While the invention has been shown and described with respect to a specific embodiment, it is understood that various alternatives and modifications are contemplated as being within the scope of the present invention. For example, and without limitation, while the wrap material advancement indication is shown as being provided by sensing rotation of idler roll 48, any other component that engages wrap material W may be employed, such as driven nip roll 46, so long as any such component rotates in response to advancement of web material W. Further, it is also contemplated that any other type of rotation sensing mechanism may be employed to detect rotation of the rotatable member engaged with wrap material web W, in place of the magnet and magnetic sensor system as shown and described. In addition, while the visual indication of wrap material advancement is described as being in the form of ascending numerical counts, it is also understood that any other type of visual display may be employed, e.g. an icon that flashes at a rate of speed corresponding to the rate of advancement of the wrap material.

Various alternatives and embodiments are contemplated as being within the scope of the following claims particularly pointing out and distinctly claiming the subject matter regarded as the invention.

We claim:

1. An operation sensor for a round baler having a wrap material dispensing system for applying wrap material to the bale, comprising:
    a wrap material advancing system for advancing the wrap material, wherein the advancing arrangement includes a rotatable member with which the wrap material is engaged;
    a rotation detecting arrangement for detecting rotation of the rotatable member during advancement of the wrap material; and
    a visual display interconnected with the rotation detecting arrangement for providing the user with a visual indication of the rate of advancement of the wrap material.

2. The operation sensor of claim 1, wherein the wrap material advancing arrangement includes a motor which advances the wrap material at a first rate of advancement, and wherein the wrap material advancing arrangement is operable to engage the wrap material with a wrap material feeding arrangement which includes one or more belts forming a part of the round baler for moving the wrap material into engagement with the bale, wherein the wrap material feeding arrangement provides advancement of the wrap material at a second rate of advancement greater than the first rate of advancement, and wherein the rotation detecting arrangement and the visual display are operable to provide the user with a visual indication of the different rates of advancement of the wrap material.

3. The operation sensor of claim 2, wherein the visual display comprises an ascending count of revolutions of the rotatable member, wherein the frequency of the ascending count corresponds to the rate of advancement of the wrap material.

4. The operation sensor of claim 3, wherein the baler includes a processor, and wherein the visual display is interconnected with the processor and the rotation detection arrangement is operable to provide inputs to the processor indicative of the speed of rotation of the rotatable member and thereby the rate of advancement of the wrap material.

5. The operation sensor of claim 4, wherein the processor is operable to convert the inputs from the rotation detecting arrangement into an ascending numerical count indicative of the speed of rotation of the rotatable member and thereby the rate of advancement of the wrap material.

6. A method of monitoring the supply of wrap material to a round bale from a wrap material dispensing arrangement which includes at least one rotatable member that rotates as wrap material is advanced toward the bale, comprising the steps of:
    sensing rotation of the rotatable member, wherein the speed of rotation of the rotatable member corresponds to the rate of advancement of the wrap material; and
    providing a visual indication to an operator of the speed of rotation of the rotatable member to enable the operator to ascertain the rate of advancement of the wrap material.

7. The method of claim 6, wherein the wrap material dispensing arrangement is operable to advance the wrap material at a first rate of advancement and wherein the wrap material is advanced at a second rate of advancement when the wrap material is engaged with the bale, and wherein the visual indication varies according to the rate of advancement of the wrap material to provide the operator with a visual indication of advancement of the wrap material by the wrap material dispensing system and by engagement of the wrap material with the bale.

8. The method of claim 7, wherein the step of providing a visual indication to an operator is carried out by providing a visual ascending count having a frequency that corresponds to the speed of rotation of the rotatable member and thereby the rate of advancement of the wrap material.

9. The method of claim 7, wherein the baler includes a processor and wherein the step of providing a visual indication to the operator is carried out by means of a visual display interconnected with the processor.

10. The method of claim 9, wherein the step of sensing rotation of the rotatable member is carried out by a rotation sensor interconnected with the processor to provide inputs to the processor that correspond to rotation of the rotatable member.

11. In a round baler for forming round bales of agricultural crop material and including a wrap material dispensing arrangement for applying wrap material to the round bale subsequent to formation of the round bale, wherein the wrap material dispensing arrangement includes a rotatable member with which the wrap material is engaged and which rotates upon advancement of the wrap material, the improvement comprising a sensor for sensing rotation of the rotatable member, and a visual display interconnected with the sensor, wherein the visual display is operable to provide a visual indication of the speed of rotation of the rotatable member and thereby the rate of advancement of the wrap material.

12. The improvement of claim 11, wherein the baler includes a processor interconnected with the visual display, and wherein the processor is interconnected with the sensor, wherein the processor is operable in response to inputs from the sensor to output on the visual display a visual indication of the speed of rotation of the rotatable member.

13. The improvement of claim 12, wherein the processor is operable to provide an ascending count of the number of revolutions of the rotatable member, wherein the frequency of the ascending count corresponds to the speed of rotation of the rotatable member and thereby the rate of advancement of the wrap material.

14. The improvement of claim 13, wherein the wrap material advancing arrangement is operable to advance the wrap material at a first rate of advancement to a wrap material feeding arrangement associated with the baler, and wherein the wrap material feeding arrangement is operable to advance the wrap material at a second rate of advancement different than the first rate of advancement, and wherein the correspondence between the frequency of the ascending count and the rate of advancement of the wrap material provides the operator with an indication as to advancement of the wrap material by the dispensing system and by the wrap material feeding arrangement.

15. A round baler for forming round bales of agricultural crop material, comprising:

a series of belts that define a bale-forming chamber within which the round bale is formed;

a wrap material dispenser for supplying wrap material for application to the round bale through a wrap material inlet;

sensing means for sensing the rate of advancement of the wrap material; and visual indicator means responsive to the sensing means for providing the operator with a visual indication of the rate of advancement of the wrap material by the wrap material dispenser.

16. The round baler of claim 15, wherein the wrap material dispenser includes a rotatable member with which the wrap material is engaged such that the speed of rotation of the rotatable member corresponds to the rate of advancement of the wrap material, and wherein the sensing means is operable to sense the speed of rotation of the rotatable member to sense the rate of advancement of the wrap material.

17. The round baler of claim 16, wherein the round baler includes a processor, wherein the processor is interconnected with the visual indicator means and with the sensing means, and wherein the processor is operable to provide a visual output on the visual indicator means that indicates the speed of rotation of the rotatable member and thereby the rate of advancement of the wrap material.

18. The round baler of claim 17, wherein the processor is configured to provide a visual output in the form of an ascending count of revolutions of the rotatable member, wherein the frequency of the ascending count corresponds to the rate of advancement of the rotatable member.

19. The round baler of claim 18, wherein the wrap material is supplied to the wrap material inlet of the baler via a wrap material feeding arrangement including the baler belts, wherein the wrap material is engaged with the baler belts to move the wrap material toward the wrap material inlet at a rate of advancement greater than the rate of advancement of the wrap material by the wrap material dispenser, and wherein the relationship between the frequency of the ascending count and the rate of advancement of the wrap material provides the operator with a visual indication of advancement of the wrap material by the wrap material dispenser and by the wrap material feeding arrangement.

\* \* \* \* \*